(12) United States Patent
Deng

(10) Patent No.: US 11,002,906 B2
(45) Date of Patent: May 11, 2021

(54) WAVEGUIDE DEVICE AND OPTICAL ENGINE

(71) Applicant: HTC Corporation, Taoyuan (TW)

(72) Inventor: Qing-Long Deng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 34 days.

(21) Appl. No.: 16/732,362

(22) Filed: Jan. 2, 2020

(65) Prior Publication Data

US 2020/0209471 A1 Jul. 2, 2020

Related U.S. Application Data

(60) Provisional application No. 62/787,392, filed on Jan. 2, 2019.

(51) Int. Cl.
 *G02B 6/10* (2006.01)
 *G02B 27/01* (2006.01)
 *G02B 5/18* (2006.01)

(52) U.S. Cl.
 CPC ........... *G02B 6/105* (2013.01); *G02B 5/1814* (2013.01); *G02B 27/0172* (2013.01); *G02B 2027/0174* (2013.01)

(58) Field of Classification Search
 None
 See application file for complete search history.

(56) References Cited

U.S. PATENT DOCUMENTS

2014/0064655 A1* 3/2014 Nguyen ............ G02B 27/0081
385/11

FOREIGN PATENT DOCUMENTS

| CN | 108398791 A | 8/2018 |
| TW | I570443 B | 2/2017 |
| WO | 2017034765 A1 | 3/2017 |

OTHER PUBLICATIONS

Corresponding Taiwan office action dated Dec. 4, 2020.

* cited by examiner

*Primary Examiner* — Chad H Smith
(74) *Attorney, Agent, or Firm* — CKC & Partners Co., LLC

(57) ABSTRACT

A waveguide device includes two diffractive optical elements, a waveguide element, and two polarizing units. Each of the diffractive optical elements has a grating configured to diffract light of a wavelength to propagate with a diffraction angle. The waveguide element is configured to guide light propagated from one of the diffractive optical elements to the other of the diffractive optical elements. The polarizing units are at opposite surfaces of the waveguide element and optically coupled between the diffractive optical elements. Each of the polarizing units is configured to reflect light of a first polarization characteristic and transmit light of a second polarization characteristic.

18 Claims, 5 Drawing Sheets

WAVEGUIDE DEVICE AND OPTICAL ENGINE

CROSS-REFERENCE TO RELATED APPLICATION

This application claims priority to U.S. Provisional Application Ser. No. 62/787,392, filed on Jan. 2, 2019, which is herein incorporated by reference.

BACKGROUND

Technical Field

The present disclosure relates to a waveguide device and an optical engine.

Description of Related Art

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image to a location where a user of a device can view the image as a virtual image in an augmented reality environment. As this is still an emerging technology, there are certain challenges associated with utilizing waveguides to display images of virtual objects to a user.

Nowadays, many conventional waveguides with diffraction gratings attached thereon have been used. Each of the waveguides and the diffraction gratings attached thereon are used for transmitting a single color. As such, a conventional optical engine for providing projected images to an eye of a user usually requires a plurality of waveguides to transmit three primary colors. For example, after entering a waveguide, lights of different wavelengths are diffracted to propagate with different diffraction angles in the waveguide, respectively. However, if the diffraction angle of the light of a certain wavelength is smaller than a critical angle of the waveguide, the light cannot be reflected in the waveguide based on the principle of total reflection and will transmit out of the waveguide. As a result, the efficiency of the waveguide is low.

Accordingly, it is an important issue for the industry to provide an optical engine capable of solving the aforementioned problems.

SUMMARY

An aspect of the disclosure is to provide a waveguide device and an optical engine that can efficiently solve the aforementioned problems.

According to an embodiment of the disclosure, a waveguide device includes two diffractive optical elements, a waveguide element, and two polarizing units. Each of the diffractive optical elements has a grating configured to diffract light of a wavelength to propagate with a diffraction angle. The waveguide element is configured to guide light propagated from one of the diffractive optical elements to the other of the diffractive optical elements. The polarizing units are respectively at opposite surfaces of the waveguide element and optically coupled between the diffractive optical elements. Each of the polarizing units is configured to reflect light of a first polarization characteristic and transmit light of a second polarization characteristic.

In an embodiment of the disclosure, the polarizing units are between the diffractive optical elements in an arrangement direction.

In an embodiment of the disclosure, the diffractive optical elements are respectively at the opposite surfaces of the waveguide element.

In an embodiment of the disclosure, the light of the first polarization characteristic is one of p-wave light and s-wave light, and the light of the second polarization characteristic is the other of the p-wave light and the s-wave light.

In an embodiment of the disclosure, the light of the first polarization characteristic is one of left-hand circularly polarized light and right-hand circularly polarized light, and the light of the second polarization characteristic is the other of the left-hand circularly polarized light and the right-hand circularly polarized light.

In an embodiment of the disclosure, at least one of the diffractive optical elements is a reflective holographic element.

In an embodiment of the disclosure, at least one of the diffractive optical elements is a transmissive holographic element.

According to an embodiment of the disclosure, an optical engine includes a projector, two diffractive optical elements, a waveguide element, and two polarizing units. The projector is configured to project light of a wavelength. Each of the diffractive optical elements has a grating configured to diffract the light of the wavelength to propagate with a diffraction angle. The waveguide element is configured to guide light propagated from one of the diffractive optical elements to the other of the diffractive optical elements. The polarizing units are respectively at opposite surfaces of the waveguide element and optically coupled between the diffractive optical elements. Each of the polarizing units is configured to reflect light of a first polarization characteristic and transmit light of a second polarization characteristic.

In an embodiment of the disclosure, the optical engine further includes a polarization adjustment element optically coupled between the projector and said one of the diffractive optical elements.

In an embodiment of the disclosure, the optical engine further includes a moving module configured to selectively move the polarization adjustment element to be optically between the projector and said one of the diffractive optical elements.

In an embodiment of the disclosure, the polarization adjustment element comprises at least one of a polarizer, a half-wave plate, and a quarter-wave plate.

Accordingly, in the waveguide device and the optical engine of the present disclosure, since the two polarizing units that are configured to reflect light of a first polarization characteristic and transmit light of a second polarization characteristic are respectively at opposite surfaces of the waveguide element, in addition to the light that originally satisfies the principle of total reflection and can still be guided by the waveguide element, a part of the light propagating with a diffraction angle smaller than the critical angle of the waveguide element can also controlled in the waveguide element by the polarizing units. As such, the efficiency of the waveguide device can be improved. In addition, the waveguide device and the optical engine of the present disclosure can filter out the light of the first polarization characteristic in the external environment to eliminate ghost images and noise, and the light of the second polarization characteristic in the external environment can still propagate to an eye of a user without affecting the effect of augmented reality.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
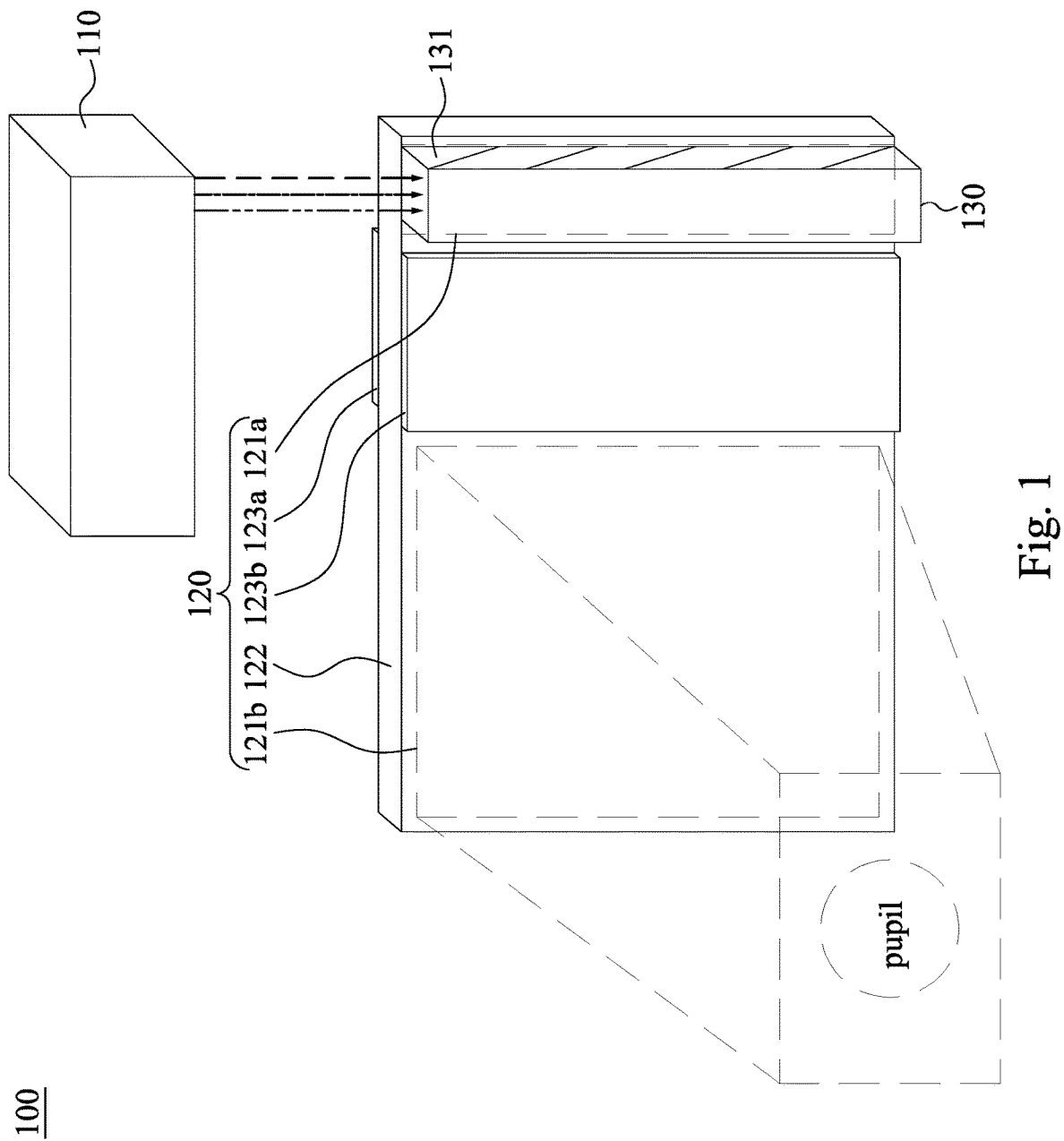
FIG. 1 is a schematic view of an optical engine according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic view of an optical engine 100 according to some embodiments of the present disclosure. As shown in FIG. 1, the optical engine 100 may be used in an augmented reality device (not shown) which can be implemented as head-mounted display (HMD) glasses or other wearable display devices, but is not limited thereto. The optical engine 100 includes a projector 110 and a waveguide device 120. The waveguide device 120 includes two diffractive optical elements 121a, 121b and a waveguide element 122. The diffractive optical elements 121a, 121b are attached to the waveguide element 122 and serve as light guiding elements of light-input and light-output, respectively. That is, light projected by the projector 110 can be inputted to the diffractive optical element 121a and outputted from the diffractive optical element 121b, and the waveguide element 122 is configured to guide the light propagated from the diffractive optical element 121a to the diffractive optical element 121b based on the principle of total reflection.

In some embodiments, the projector 110 is configured to project red light, green light, and blue light, but the disclosure is not limited in this regard. In some embodiments, the wavelength band of the red light is from about 622 nm to about 642 nm, but the disclosure is not limited in this regard. In some embodiments, the wavelength band of the green light is from about 522 nm to about 542 nm, but the disclosure is not limited in this regard. In some embodiments, the wavelength band of the blue light is from about 455 nm to about 475 nm, but the disclosure is not limited in this regard. In some embodiments, the projector 110 adopts light-emitting diodes to project the red light, the green light, and the blue light. In practical applications, the projector 110 may adopt laser diodes to project the red light, the green light, and the blue light with smaller wavelength band.

Figure 2:
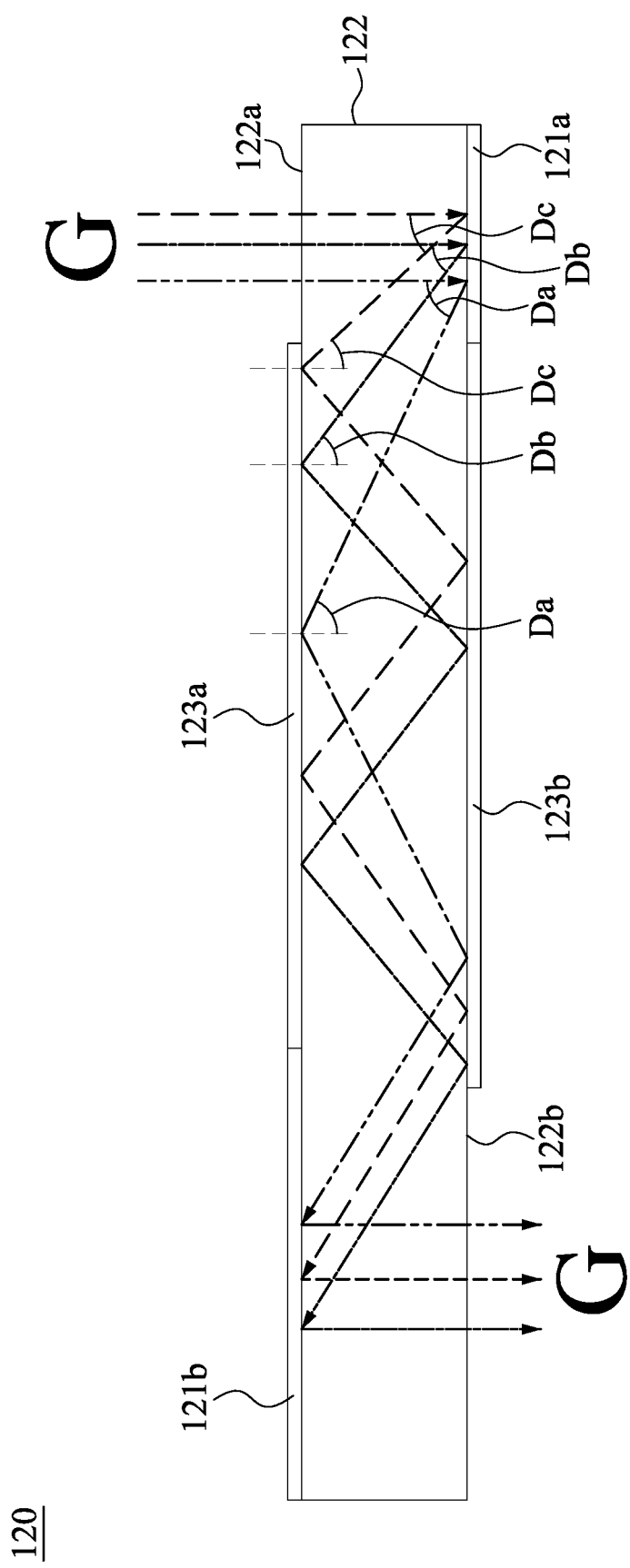
FIG. 2 is a schematic view of a waveguide device according to some embodiments of the present disclosure.

Reference is made to FIG. 2. FIG. 2 is a schematic view of the waveguide device 120 according to some embodiments of the present disclosure. As shown in FIG. 2, the diffractive optical element 121a at least has a first grating. The first grating is configured to diffract, for example, the green light G to propagate with a range of diffraction angle. For example, the first grating is configured to diffract at least three rays (as shown in FIG. 2) of the green light G of which the wavelengths are within the range from about 522 nm to about 542 nm to propagate with diffraction angles Da, Db, Dc, respectively. If all of the diffraction angles Da, Db, Dc are greater than the critical angle of the waveguide element 122, the three rays of the green light G can propagate in the waveguide element 122 based on the principle of total reflection until reaching the diffractive optical element 121b. If at least the diffraction angle Dc is smaller than the critical angle of the waveguide element 122, the ray propagating with the diffraction angle Dc may transmit out of the waveguide element 122 and would not reach the diffractive optical element 121b through the waveguide element 122. In order to control the ray propagating with the diffraction angle Dc to be guided to the diffractive optical element 121b, the waveguide device 120 further includes two polarizing units 123a, 123b. The polarizing units 123a, 123b are respectively at opposite surfaces 122a, 122b of the waveguide element 122 and optically coupled between the diffractive optical elements 121a, 121b. The opposite surfaces 122a, 122b of the waveguide element 122 are parallel to each other. In some embodiments, the polarizing units 123a, 123b are between the diffractive optical elements 121a, 121b in an arrangement direction (e.g., the horizontal direction in FIG. 2 that is parallel to the surfaces 122a, 122b). Each of the polarizing units 123a, 123b is configured to reflect light of a first polarization characteristic and transmit light of a second polarization characteristic.

In some embodiments, the diffractive optical element 121b may also be formed with the first grating. As such, portions of the green light G propagating in the waveguide element 122 can be diffracted by the first grating of the diffractive optical element 121b and then be outputted out of the waveguide device 120 to reach an eye (i.e., the pupil as shown in FIG. 1) of a user.

With the aforementioned configuration, even if the ray propagating with the diffraction angle Dc smaller than the critical angle of the waveguide element 122 may transmit out of the waveguide element 122 and would not be guided by the waveguide element 122, a part of the ray having the first polarization characteristic will be reflected by the polarizing units 123a, 123b until reaching the diffractive optical element 121b, while a part of the ray having the second polarization characteristic will transmit through the polarizing units 123a, 123b. As such, the efficiency of the waveguide device 120 can be improved. In addition, the waveguide device 120 can filter out the light of the first polarization characteristic in the external environment to eliminate ghost images and noise, and the light of the second polarization characteristic in the external environment can still propagate to the eye of the user without affecting the effect of augmented reality.

In some embodiments, the diffractive optical element 121a may further have a second grating configured to diffract the red light to propagate with a range of diffraction angle. Similarly, even if a ray of the red light propagating with a diffraction angle smaller than the critical angle of the waveguide element 122 may transmit out of the waveguide element 122 and would not be guided by the waveguide element 122, a part of the ray of the red light having the first polarization characteristic will be reflected by the polarizing units 123a, 123b until reaching the diffractive optical element 121b, while a part of the ray of the red light having the second polarization characteristic will transmit through the polarizing units 123a, 123b.

In some embodiments, the diffractive optical element 121b may also be formed with the second grating. As such, portions of the red light propagating in the waveguide element 122 can be diffracted by the second grating of the diffractive optical element 121b and then be outputted out of the waveguide device 120 to reach the eye of the user.

In some embodiments, the diffractive optical element 121a may further have a third grating configured to diffract the blue light to propagate with a range of diffraction angle. Similarly, even if a ray of the blue light propagating with a diffraction angle smaller than the critical angle of the waveguide element 122 may transmit out of the waveguide element 122 and would not be guided by the waveguide element 122, a part of the ray of the blue light having the first polarization characteristic will be reflected by the polarizing units 123a, 123b until reaching the diffractive optical element 121b, while a part of the ray of the blue light having the second polarization characteristic will transmit through the polarizing units 123a, 123b.

In some embodiments, the diffractive optical element 121b may also be formed with the third grating. As such, portions of the blue light propagating in the waveguide element 122 can be diffracted by the third grating of the diffractive optical element 121b and then be outputted out of the waveguide device 120 to reach the eye of the user.

In some embodiments, the first grating, the second grating, and the third grating are thin holographic gratings. In some embodiments, the first grating, the second grating, and the third grating are volume holographic gratings. It is notable that light diffracted by a volume holographic grating can propagate with a specific diffraction angle based on the Bragg's law.

In some embodiments, a volume holographic grating can form a transmissive holographic grating or a reflective holographic grating according to different fabrication methods.

In some embodiments, any of the diffractive optical elements 121a, 121b can be fabricated as a transmissive holographic element or a reflective holographic element. For example, as shown in FIG. 2, the diffractive optical elements 121a, 121b are both reflective holographic elements and at the opposite surfaces 122a, 122b of the waveguide element 122 respectively. Specifically, the diffractive optical elements 121a, 121b are respectively attached to the opposite surfaces 122a, 122b of the waveguide element 122.

Figure 3:
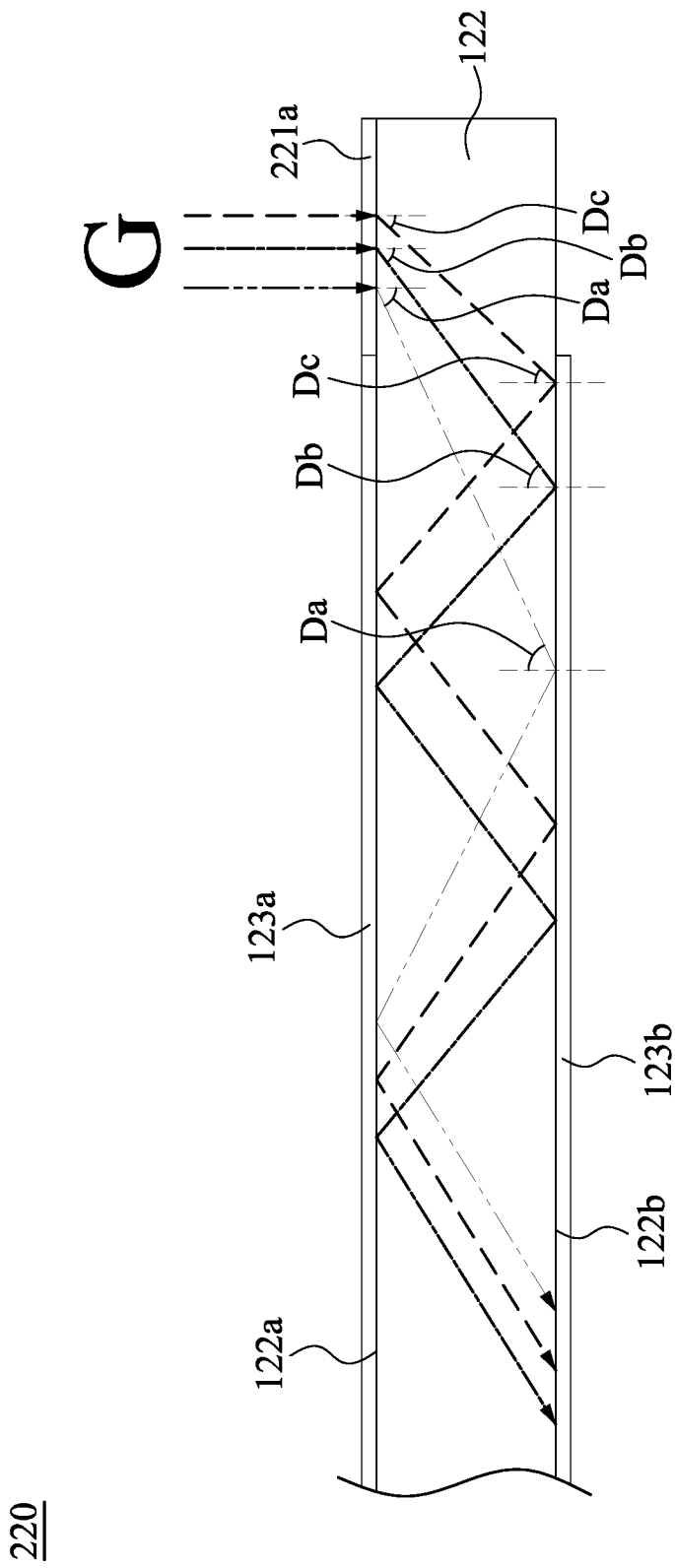
FIG. 3 is a schematic view of a waveguide device according to some embodiments of the present disclosure.

Reference is made to FIG. 3. FIG. 3 is a schematic view of a waveguide device 220 according to some embodiments of the present disclosure. The embodiments as illustrated by FIG. 3 differ from the embodiments as illustrated by FIG. 2 in that the diffractive optical element 221a is a transmissive holographic element. In other words, the diffractive optical elements 221a, 121b are at an identical side of the waveguide element 122. Specifically, the diffractive optical elements 221a, 121b are attached to the same surface 122a of the waveguide element 122.

In some embodiments, as shown in FIG. 2, the waveguide element 122 is in shape of a cuboid. That is, the opposite surfaces 122a, 122b of the waveguide element 122 are parallel to each other, but the disclosure is not limited in this regard.

As shown in FIG. 1, the optical engine 100 further includes a beam splitting module 130 optically coupled between the projector 110 and the diffractive optical element 121a. The beam splitting module 130 is configured to expand the images projected by the projector 110 in one dimension, so as to further increase the viewing angle of the images outputted out of the waveguide device 120. In addition, by using the beam splitting module 130, the light outlet of the projector 110 can be designed as a small aperture to avoid the overall volume of the optical engine 100 being too large. In some embodiments, the beam splitting module 130 includes a plurality of splitters 131 arranged away from the projector along the above-mentioned dimension. That is, each of the splitters 131 is optically coupled between the projector 110 and a part of the diffractive optical element 121a.

In some embodiments, the projector 110 may be a telecentric system or a non-telecentric system.

In some embodiments, the light of the first polarization characteristic is p-wave light, and the light of the second polarization characteristic is s-wave light. For example, the light projected out of the projector 110 may be p-wave light, and the polarizing units 123a, 123b configured to reflect the p-wave light projected by the projector 110 may be adopted. In some embodiments, the projector 110 may include a conventional panel module or a LCOS (Liquid Crystal on Silicon) module.

In another example, the light projected out of the projector 110 may include p-wave light and s-wave light, and the polarizing units 123a, 123b configured to reflect the p-wave light of the light projected by the projector 110 and transmit the s-wave light of the light projected by the projector 110 may be adopted. In some embodiments, the projector 110 may include a DLP (Digital Light Processing) module.

Figure 4A:
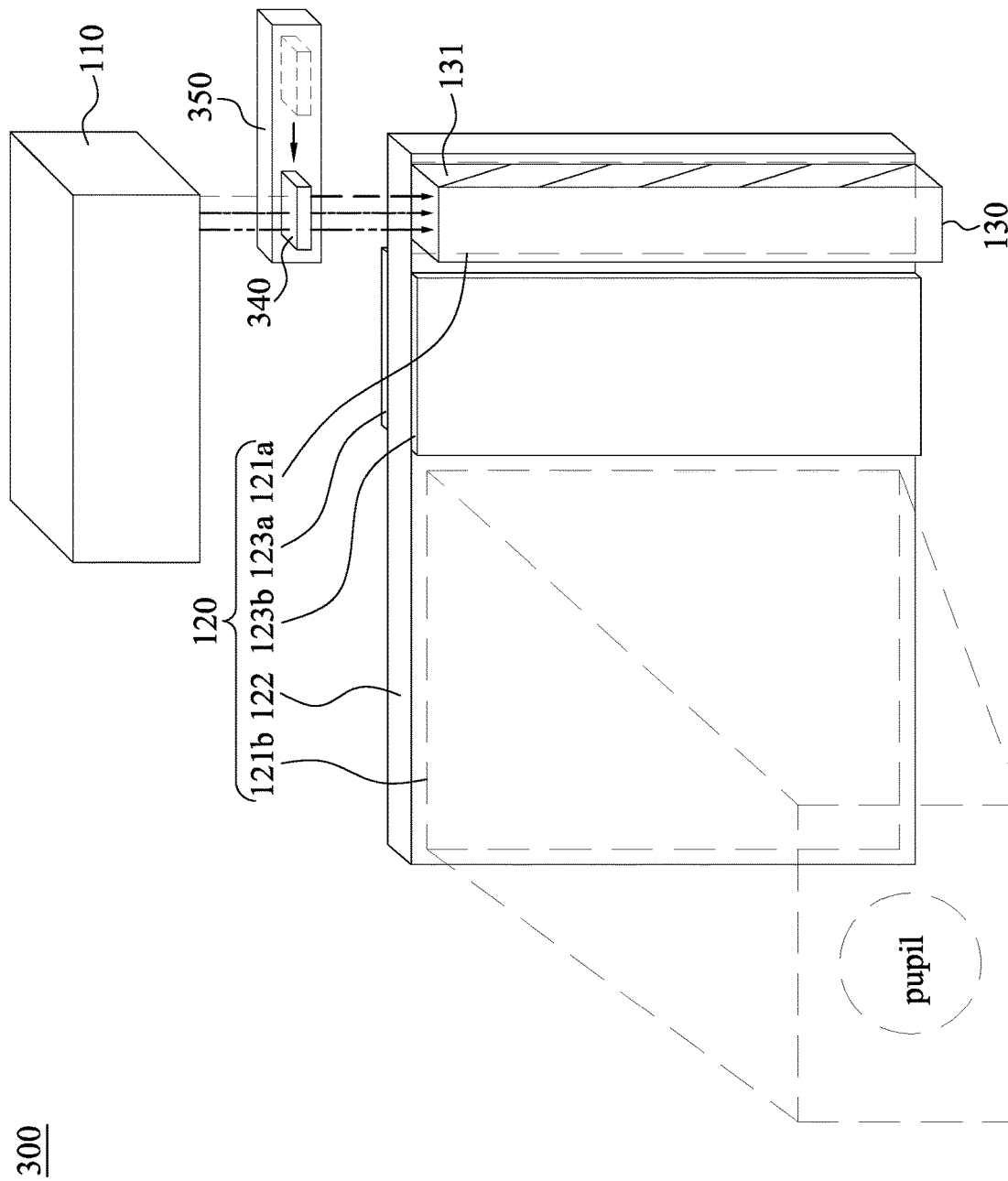
FIG. 4A is a schematic view of an optical engine according to some embodiments of the present disclosure.
Figure 4B:
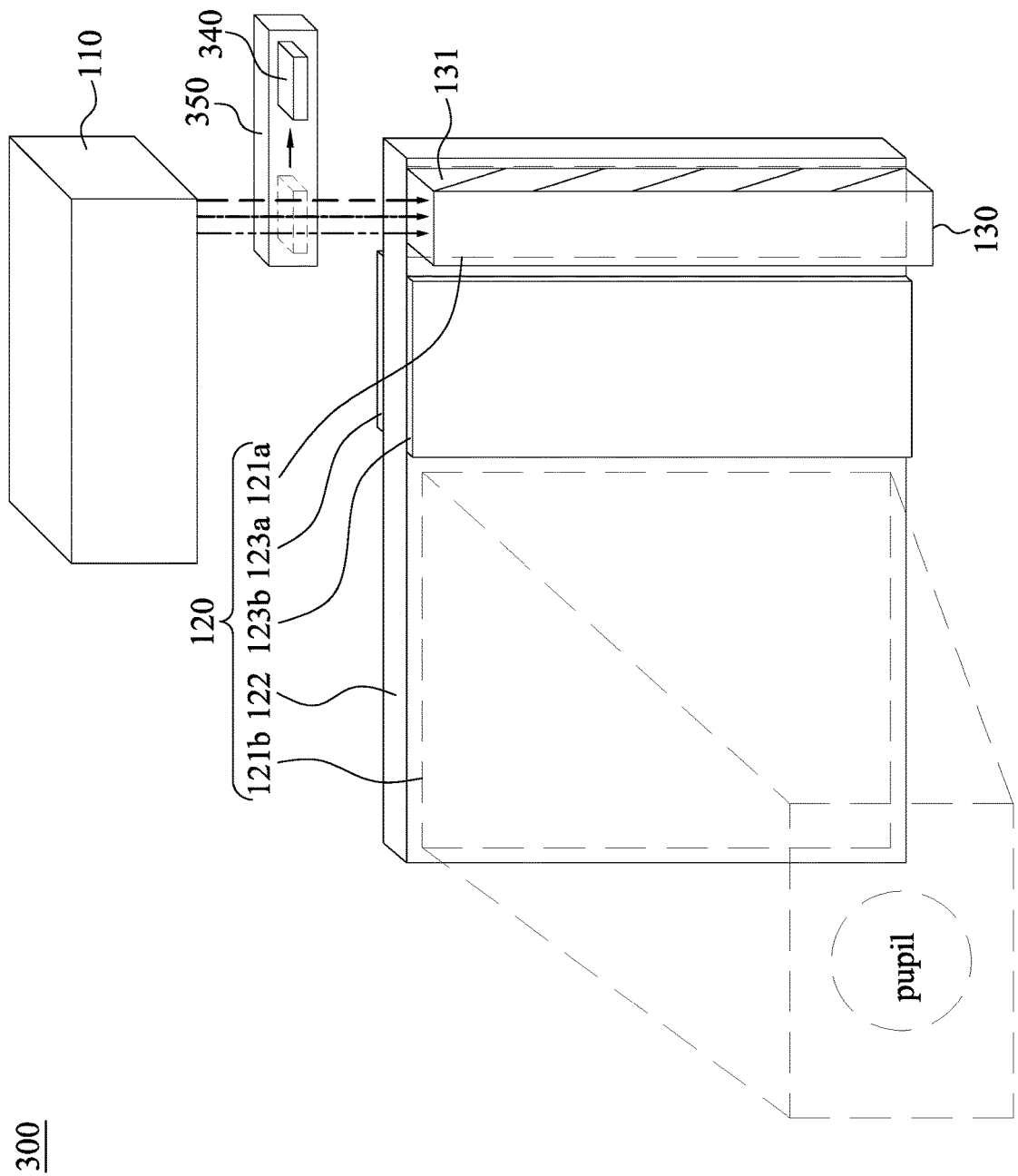
FIG. 4B is another schematic view of the optical engine shown in FIG. 4A.

Reference is made to FIGS. 4A and 4B. FIG. 4A is a schematic view of an optical engine 300 according to some embodiments of the present disclosure. FIG. 4B is another schematic view of the optical engine 300 shown in FIG. 4A. Compared to the optical engine 100 of the embodiments as illustrated by FIG. 1, the optical engine 300 of the embodiments as illustrated by FIGS. 4A and 4B further includes a polarization adjustment element 340. The polarization adjustment element 340 is optically coupled between the projector 110 and the diffractive optical element 121a (via the beam splitting module 130).

In some embodiments, the polarizing units 123a, 123b configured to reflect p-wave light and transmit s-wave light are adopted, and the light projected out of the projector 110 includes p-wave light and s-wave light. That is, the light of the first polarization characteristic is p-wave light, and the light of the second polarization characteristic is s-wave light. Under the circumstances, a polarizer can be used as the polarization adjustment element 340 to filter out the s-wave light projected by the projector 110 and allow the p-wave light projected by the projector 110 to pass.

In some embodiments, the polarizing units 123a, 123b configured to reflect s-wave light and transmit p-wave light are adopted, and the light projected out of the projector 110 includes p-wave light and s-wave light. That is, the light of the first polarization characteristic is s-wave light, and the light of the second polarization characteristic is p-wave light. Under the circumstances, a polarizer can be used as the polarization adjustment element 340 to filter out the p-wave light projected by the projector 110 and allow the s-wave light projected by the projector 110 to pass.

In some embodiments, the polarizing units 123a, 123b configured to reflect s-wave light and transmit p-wave light are adopted, and the light projected out of the projector 110 includes p-wave light. That is, the light of the first polarization characteristic is s-wave light, and the light of the second polarization characteristic is p-wave light. Under the circumstances, a half-wave plate can be used as the polarization adjustment element 340 to convert the p-wave light projected by the projector 110 into s-wave light.

In some embodiments, the polarizing units 123a, 123b configured to reflect right-hand circularly polarized light and transmit left-hand circularly polarized light are adopted, and the light projected out of the projector 110 includes p-wave light. Under the circumstances, a quarter-wave plate can be used as the polarization adjustment element 340 to convert the p-wave light projected by the projector 110 into right-hand circularly polarized light. In some other embodiments, the polarizing units 123a, 123b configured to reflect left-hand circularly polarized light and transmit right-hand circularly polarized light are adopted, and the light projected out of the projector 110 includes p-wave light. Under the circumstances, a quarter-wave plate can be used as the polarization adjustment element 340 to convert the p-wave light projected by the projector 110 into left-hand circularly polarized light.

As shown in FIGS. 4A and 4B, the optical engine 300 further includes a moving module 350. The moving module 350 is configured to selectively move the polarization adjustment element 340 to be optically between the projector 110 and the diffractive optical element 121a. As mentioned above, the polarization adjustment element 340 may include at least one of the polarizer, the half-wave plate, and the quarter-wave plate. As such, the polarization adjustment element 340 can be selectively used to adjust the polarization of the light projected by the projector 110 according to practical requirements.

In some embodiments, the waveguide element 122 can be made of a material having a refractive index from about 1.4 to about 2.2. In some embodiments, the material of the waveguide element 122 may include glass, plastics, or transparent polymers.

According to the foregoing recitations of the embodiments of the disclosure, it can be seen that in the waveguide device and the optical engine of the present disclosure, since the two polarizing units that are configured to reflect light of a first polarization characteristic and transmit light of a second polarization characteristic are respectively at opposite surfaces of the waveguide element, in addition to the light that originally satisfies the principle of total reflection and can still be guided by the waveguide element, a part of the light propagating with a diffraction angle smaller than the critical angle of the waveguide element can also controlled in the waveguide element by the polarizing units. As such, the efficiency of the waveguide device can be improved. In addition, the waveguide device and the optical engine of the present disclosure can filter out the light of the first polarization characteristic in the external environment to eliminate ghost images and noise, and the light of the second polarization characteristic in the external environment can still propagate to an eye of a user without affecting the effect of augmented reality.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A waveguide device, comprising:
   two diffractive optical elements each having a grating configured to diffract light of a wavelength to propagate with a diffraction angle;
   a waveguide element configured to guide light propagating from one of the diffractive optical elements to the other of the diffractive optical elements; and
   two polarizing units respectively at opposite surfaces of the waveguide element and optically coupled between the diffractive optical elements, wherein each of the polarizing units is configured to reflect light of a first polarization characteristic and transmit light of a second polarization characteristic.

2. The waveguide device of claim 1, wherein the polarizing units are between the diffractive optical elements in an arrangement direction.

3. The waveguide device of claim 1, wherein the diffractive optical elements are respectively at the opposite surfaces of the waveguide element.

4. The waveguide device of claim 1, wherein the light of the first polarization characteristic is one of p-wave light and s-wave light, and the light of the second polarization characteristic is the other of the p-wave light and the s-wave light.

5. The waveguide device of claim 1, wherein the light of the first polarization characteristic is one of left-hand circularly polarized light and right-hand circularly polarized light, and the light of the second polarization characteristic is the other of the left-hand circularly polarized light and the right-hand circularly polarized light.

6. The waveguide device of claim 1, wherein at least one of the diffractive optical elements is a reflective holographic element.

7. The waveguide device of claim 1, wherein at least one of the diffractive optical elements is a transmissive holographic element.

8. An optical engine, comprising:
   a projector configured to project light of a wavelength;
   two diffractive optical elements each having a grating configured to diffract the light of the wavelength to propagate with a diffraction angle;
   a waveguide element configured to guide light propagating from one of the diffractive optical elements to the other of the diffractive optical elements; and
   two polarizing units respectively at opposite surfaces of the waveguide element and optically coupled between the diffractive optical elements, wherein each of the polarizing units is configured to reflect light of a first polarization characteristic and transmit light of a second polarization characteristic.

9. The optical engine of claim 8, wherein the polarizing units are between the diffractive optical elements in an arrangement direction.

10. The optical engine of claim 8, wherein the diffractive optical elements are respectively at the opposite surfaces of the waveguide element.

11. The optical engine of claim 8, wherein the diffractive optical elements are at one of the opposite surfaces of the waveguide element.

12. The optical engine of claim 8, wherein the light of the first polarization characteristic is one of p-wave light and s-wave light, and the light of the second polarization characteristic is the other of the p-wave light and the s-wave light.

13. The optical engine of claim 8, wherein the light of the first polarization characteristic is one of left-hand circularly polarized light and right-hand circularly polarized light, and the light of the second polarization characteristic is the other of the left-hand circularly polarized light and the right-hand circularly polarized light.

14. The optical engine of claim 8, wherein at least one of the diffractive optical elements is a reflective holographic element.

15. The optical engine of claim 8, wherein at least one of the diffractive optical elements is a transmissive holographic element.

16. The optical engine of claim 8, further comprising a polarization adjustment element optically coupled between the projector and said one of the diffractive optical elements.

17. The optical engine of claim 16, further comprising a moving module configured to selectively move the polarization adjustment element to be optically between the projector and said one of the diffractive optical elements.

18. The optical engine of claim 16, wherein the polarization adjustment element comprises at least one of a polarizer, a half-wave plate, and a quarter-wave plate.

\* \* \* \* \*